Feb. 8, 1927. 1,616,770
L. R. TRIPP
FLUID BRAKE
Filed Nov. 16, 1925
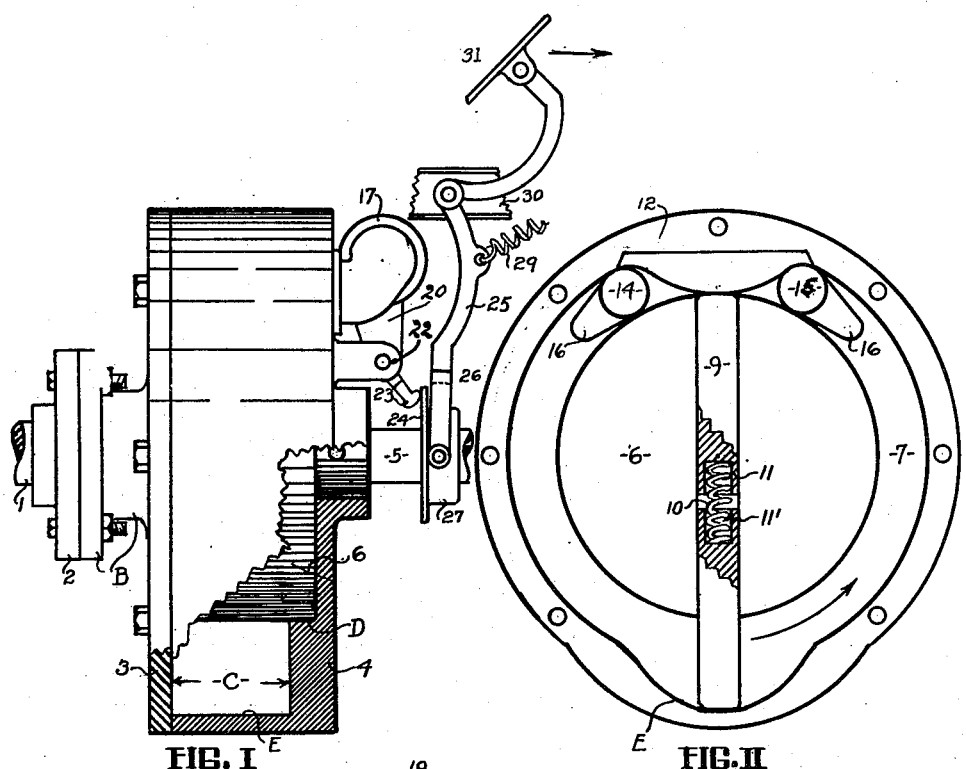
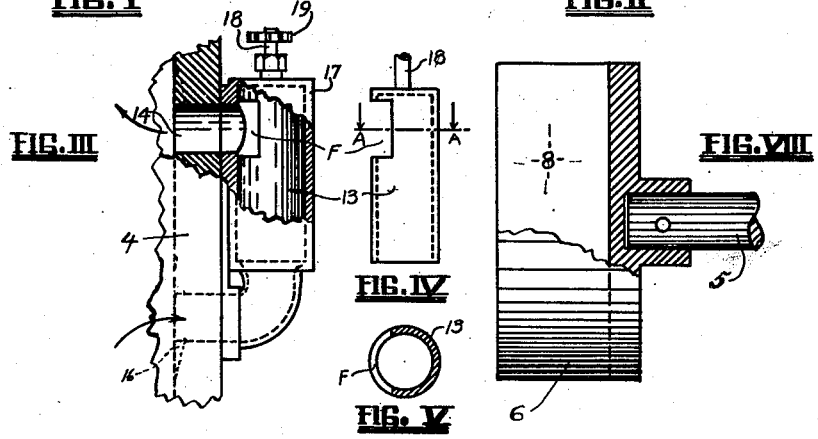
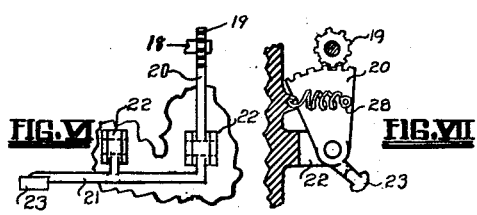
INVENTOR.
LESLIE R. TRIPP.
BY
U. G. Charles ATTORNEYS.

Patented Feb. 8, 1927.

1,616,770

UNITED STATES PATENT OFFICE.

LESLIE R. TRIPP, OF TOPEKA, KANSAS.

FLUID BRAKE.

Application filed November 16, 1925. Serial No. 69,449.

My invention relates to a fluid brake for vehicles.

The object of my invention is to provide a fluid brake in axial with the drive shaft of an automobile or other power driven vehicle.

A further object of my invention is to provide a brake eliminating the usual friction between two bodies functioning as a brake.

A still further object of my invention is to provide a braking means that will function as a clutch.

A still further object of my invention is to provide a mechanism that will function as a pump.

A still further object of my invention is to provide a mechanism functioning as an attachment substituting member A in my former application for fluid transmission filed October 22, 1925, Serial No. 64,270.

In the drawings like characters will apply to like parts in the different views.

The drawings disclosing my invention consist of eight views, namely—

Fig. 1 is an elevation of the device with controlling lever attached, housing partly in section.

Fig. 2 is a view of the interior, the cap being removed.

Fig. 3 is a fragmentary transverse view of the valve as shown in Fig. 1, parts removed for convenience of description.

Fig. 4 is an elevation of the valve.

Fig. 5 is a sectional view through the valve on line A, Fig. 4 looking in the direction of the arrow.

Fig. 6 is an edge view of the sector and foot lever.

Fig. 7 is a side view of the sector and pinions.

Fig. 8 is a side view of the rotor, part in section for convenience of description.

Referring in detail to the drawings:

1 is a driven shaft, 2 is a flange rigidly connected thereto, 3 is a cap for housing 4, the said cap having necked flange as at D and securely bolted to flange 2, on the opposite side and in axial alignment is a drive shaft 5, the said shaft being rigidly connected to a rotor 6, the said rotor being housed within said housing 4 and rotatably engaging therein, the said rotor being concentrically positioned in said housing and of lesser diameter provides a working chamber 7, functioning as a fluid compression chamber.

On the diametrical axis of said rotor is a channel 8, in which is slidably positioned a piston 9, the said piston being equal in width to the depth of the working chamber as shown at C in Fig. 1, space being defined by arrows extending in opposite directions from said letter C and that portion of the rotor housed in the side wall as at D is that portion of the metal at the base of the groove supporting the halves of the rotor. The piston 9 is composed of two members being divided near the center and having one or more springs 10 as tensioning means to expand the piston longitudinally for close engagement with the outside walls of the working chamber, the said springs engaging in apertures 11 and 11' which are in registry with each other.

The annular working chamber 7 has an abutment 12 removably positioned, the curvature of which extends across the working chamber contacting the peripheral face of the rotor and opposite thereto on the diametrical axis is a curvature in the outside wall of the working chamber as at E, coinciding with the curvature of the abutment member so that the piston will reciprocate at each revolution of the rotor, thereby maintaining compression as controlled by a rotary bypass valve 13, said valve being tubular and one end thereof communicating with a port 14, and in the opposite end of the valve is an opening adapted to register with an aperture 15, both of said apertures being through the outside wall of the working chamber and on opposite sides of the abutment; each thereof having an incline lead 16.

The said valve is rotatably mounted in a housing 13 which is rigidly attached to a housing 4; on the closed end of valve 13 is a stem 18 and on the end thereof is a gear 19 being actuated by a sector gear 20, the said sector being mounted on a shaft 21, which is supported by bearings 22 and on the end of said rod is a shoe 23 engaging with a disc 24, the said disc being reciprocated by a foot lever 25 having a yoke 26 pivotally connected to a collar 27 integral with said disc, the said collar and disc slidably engaging on shaft 5 for the reciprocations of the sector gear operating the valve for opening and closing the port 14. Attached to the sector gear and housing is a spring 28, said spring holding the port 14 and valve opening F in registry. To hold the disc from engagement with the shoe 23 I have provided a spring 29 which is attached to the arm and the frame 30 to rotate the cylinder for gradually closing the port the foot is placed on the foot lever 31 pushing it in the direction of the arrow by which means at any point of rotation of housing 4 the disc will engage with the said shoe, rocking the sector which is in mesh with the gear connected to the cylinder causing the cylinder to respond in rotation reducing the flow of the liquid as desired for braking or pumping or transmission purposes.

When the mechanism herein disclosed is to be applied as an attachment as heretofore described, the valve herein shown will be removed and the valve shown in said former application will be modified and placed between the two housings, that is to say, both ends of the valve will be the same as the end connecting to housing B, and the operating elements modified accordingly.

Such modifications may be made as lies within the scope of the appended claims.

Having thus described my invention, what I claim as new and desire to secure by Letters Patent is:—

1. In a fluid brake, a rotor rigidly connected to the drive shaft, a housing rigidly connected to the driven shaft, the said rotor concentrically and rotatably positioned in said housing, a piston slidably engaging on the diametrical axis of said rotor, an annular working chamber in said housing, a rigid abutment engaging across said chamber, a curvature coinciding with the curvature of said abutment as reciprocating means for said piston, a port positioned near each side of said abutment, a housed rotary valve connecting said ports, means for rotating said valve for the purpose shown and described.

2. In a fluid brake, a rotor and a housing, an annular working chamber in said housing, an abutment and a valve port on each side thereof, a valve connecting said ports, means for rotating said valve, fluid within said chamber and valve, the said valve adapted to control a desired compression within said chamber functioning as a brake, the said housing and rotor axially engaging in the power shaft so that the drive shaft and the driven shaft may rotate independent of each other, or simultaneously when said valve is closed.

3. In a fluid brake, a housing having a rotor concentrically positioned therein, an annular working chamber within said housing, a piston slidably engaging on the diametrical axis of said rotor, said piston being in two parts, a spring engaging between the abutting ends of said piston as expansion means longitudinally, a removable abutment closing said annular chamber, a curvature coinciding with said abutment, the said abutment and curvature being positioned on the diametrical axis and on opposite sides of said working chamber functioning as a cam for the reciprocations of said piston, a port in close proximity to both sides of said abutment, a tubular rotary valve connecting said ports functioning as a bypass, a gear connected to said valve and a sector gear in mesh with the first said gear, a rocker shaft for said sector gear, a shoe on said shaft, a disc engaging said shoe, a shifting lever for said disc as means for rotating said valve, actuating the desired compression in said working chamber, all substantially as shown and for the purpose described.

4. In a fluid brake, a brake comprising a housing, a working chamber, a rotor, and a two part piston, two ports in said housing communicating in said working chamber, an abutment closing said working chamber between said ports, a bypass valve connecting said ports for closing or permitting circulation of the fluid in said working chamber, means for operating said valve, the said brake in axial with the drive shaft, the rotor thereof being rigid with the drive shaft and the housing being rigid with the driven shaft so that both shafts may rotate independent of each other when the bypass is open or simultaneous when the bypass is closed or varying the speed of each by the gradual closing of said valve.

5. In a fluid brake, a rotor and a drive shaft rigidly attached, a housing and a driven shaft rigidly connected, said rotor being housed by said housing, the said rotor and housing in axial with said shafts, a channel in said rotor, a spring tensioned piston slidably engaging in said channel, a working chamber, said chamber being annular and positioned between said rotor and the outside wall of said housing, functioning as a fluid compression chamber, and abutment being curved so that the curvature will extend across said working chamber, a curvature outwardly extending in the wall of said housing, the said curvature and abutment co-acting for the reciprocations of said piston, a port on each side of said abutment, a bypass valve connecting with said ports so that the fluid may follow the rotations of said piston when said valve is open and by closing said valve, the said rotor and housing will rotate simultaneous functioning as a clutch, means for opening and closing said valve for the purpose set forth.

LESLIE R. TRIPP.